United States Patent [19]

Iwata et al.

[11] Patent Number: 4,826,325
[45] Date of Patent: May 2, 1989

[54] PARTICLE PROCESSING APPARATUS

[75] Inventors: Akira Iwata; Chosei Harada, both of Hyogo, Japan

[73] Assignee: Fukae Powtec Corporation, Hyogo, Japan

[21] Appl. No.: 111,742

[22] Filed: Oct. 23, 1987

[30] Foreign Application Priority Data

Nov. 6, 1986 [JP] Japan .................................. 61-262687

[51] Int. Cl.4 .......................... B01F 9/10; B01F 7/22;
B01F 15/00; F16C 32/06
[52] U.S. Cl. .................................... 366/221; 366/314;
366/331; 366/349; 384/110
[58] Field of Search ............... 366/349, 273, 274, 213,
366/221, 107, 314, 331; 384/107, 110; 310/66,
67 R, 90

[56] References Cited

U.S. PATENT DOCUMENTS

| | | | |
|---|---|---|---|
| 1,242,493 | 10/1917 | Stringham | 366/274 |
| 1,337,742 | 4/1920 | Abbott, Jr. | 384/110 |
| 3,210,848 | 10/1965 | Bizzigotti | 384/110 X |
| 3,900,952 | 8/1975 | Landgraf et al. | 310/154 X |

FOREIGN PATENT DOCUMENTS 55-109822  8/1980  Japan .................................. 384/110

Primary Examiner—Harvey C. Hornsby
Assistant Examiner—Scott J. Haugland
Attorney, Agent, or Firm—Armstrong, Nikaido, Marmelstein, Kubovcik & Murray

[57] ABSTRACT

Herein disclosed is a particle processing apparatus to be used in a wide field including food, medical and chemical industries either for granulating or coating particles on a disk by rotating the disk in a barrel equipped with scrapers or for blending the particles in the barrel by rotating blades in the barrel. The particle processing apparatus comprises: a barrel for accommodating particles to be processed; a disk-shaped rotating member having an outer circumference of V-shaped section and including processing means for processing the particles in the barrel when the rotating member is rotated; rotating means for rotating the rotating member; and an annular bearing member having an inner circumference of V-shaped section for bearing the rotating member in a rotatable manner with a small gap between its inner circumference and the outer circumference of the rotating member. The inner circumference of the bearing member is formed with a multiplicity of air injection ports for injecting therethrough compressed air supplied from the outside into the small gap.

7 Claims, 6 Drawing Sheets

PARTICLE PROCESSING APPARATUS

BACKGROUND OF THE INVENTION

1. Field of the Invention

The present invention relates to a particle processing apparatus to be used in a wide field including food, medical and chemical industries either for granulating or coating particles on a disk by rotating the disk in a barrel equipped with scrapers or for blending the particles in the barrel by rotating blades in the barrel.

2. Description of the Prior Art

Before entering into the detailed description of the present invention, cursory review will be made on examples of the particle processing apparatus according to prior art with reference to FIGS. 7 and 8. FIG. 7 shows the processing apparatus for the granulating or coating operations, and FIG. 8 shows the processing apparatus for the blending operations. FIGS. 7(a) and 8(a) are top plan sections II—II of FIGS. 7(b) and 8(b), respectively, which are front sections I—I of FIGS. 7(a) and 8(a), respectively, and FIG. 8(c) is a section III—III showing a blade of FIGS. 8(a) and 8(b).

With first reference to FIG. 7, the rotations of an electric motor M are decelerated in conformity with the granulating or coating conditions by a reduction gear mechanism R and are transmitted to a shaft 2. This shaft 2 is borne upright by bearing members 5a and 5b which are supported by a bearing support 5e. A disk 1 has a dish-shaped shallow upper face 1a and is fixed in a horizontal position on the shaft 2. A processing barrel 3 is fixedly placed on a barrel table 3e through its flange 3d and is divided into an upper conical portion 3a, a lower cylindrical barrel 3b and a bottom portion 3c which is formed with an air injection port 4a for compressed air. Between the bottom portion 3c and the lower side of the disk 1, there is defined an air passage which has communication with a small gap 4c left between the outer circumference of the disk 1 and the inner circumference of the barrel portion 3b. A plurality of (e.g., four, as shown) scrapers 6 are provided, each of which is composed of: an arcuate blade 6a, a stem 6b carrying the blade 6a; and a handle 6c for turning the stem 6b. The scrapers 6 are positioned upright in the processing barrel 3. A liquid injection nozzle 7 is provided for injecting a liquid such as a binder onto the particles lying on the upper face 1a of the disk 1 to granulate or coat them.

Now, if the disk 1 is charged on its upper face 1a with a suitable volume of particles and is turned by the motor M, the particles are swirled horizontally, as indicated at P in FIG. 7(a), while being forced from the center of the disk 1 toward the inner circumference of the processing barrel 3 by the centrifugal force of the disk 1. In the course of these swirling motions, the particles are scraped up by the blades 6a of the scrapers 6 so that they are scattered onto the inner circumference of the barrel 3. Simultaneously with this, the particles make slightly small, vertical motions, as indicated at Q in FIG. 7(b), in accordance with the rotations of the disk 1 and the shape of the inner circumference which is defined by the conical portion 3a and the cylindrical trunk portion 3b of the processing barrel 3. As a result, the particles turn back and swirl between the central and circumferential portions of the disk 1.

The granulations and coatings are accomplished by injecting a binder or the like from the liquid injection nozzle 7 onto the particles thus moving. In this instance, the small gap 4c between the disk 1 and the processing barrel 3 is supplied with the compressed air from the injection port 4a by way of the passage 4b so that it can be prevented from getting clogged with the particles.

Turning now to FIG. 8, like FIG. 7, the rotations of an electric motor M' are decelerated by a reduction gear mechanism R' and are transmitted to a shaft 12. This shaft 12 is also borne upright by bearing members 15a and 15b which are supported by a bearing support 15e. Ordinarily two (as shown) or three blades 11 are so mounted on the shaft 12 that they can rotate in a horizontal plane. Each of the blades 11 is formed into such a triangular section as has its leading slope 11a made gentler that the trailing slope 11b, as shown in FIG. 8(c). A processing barrel 13 is fixed on a barrel table 13e through its flange 13d and is composed, like the processing barrel 3 of FIG. 7, of an upper conical portion 13a, a cylindrical trunk portion 13b and a bottom portion 13c (although it is not equipped with the scrapers). The bottom portion 13c is formed at its central portion with an air injection port 14a for compressed air and an air passage 14b, which has communication with a small gap 14c between the shaft 12 and a through hole of the bottom portion 13c.

Now, if a suitable volume of particles are poured into the processing barrel 13 and the blades 11 are likewise rotated, they are caused to make horizontal swirling motions, as indicated at P' in FIG. 8(a), and vertical, small circular motions, as indicated at Q' in FIG. 8(b), by the slopes 11a of the blades 11 and the inner circumference of the processing barrel 13. As a result, the particles make the motions P' as well as the motions Q' so that they are sufficiently blended. In this instance, the small gap 14c of the bottom portion 13c of the blending barrel 13 is supplied with the compressed air from the air injection port 14a by way of the air passage 14b so that it is prevented from getting clogged with the particles.

In the apparatus of the prior art shown in FIGS. 7 and 8, however, high forces are required for turning the disk 1 of FIG. 7 and the blades 11 of FIG. 8 so that the apparatus require high drive powers and are difficult to reduce their sizes.

In order to rotate a body lightly, compressed air has been used in the prior art to make a gas bearing.

On the other hand, the apparatus of FIGS. 7 and 8 according to the prior art have to supply the small gaps 4c and 14c with the compressed air thereby to prevent them from getting clogged with the particles. Generally speaking the particle processing apparatus cannot avoid the clogging with the particles so that the use of the compressed air is unavoidable.

SUMMARY OF THE INVENTION

It is, therefore, an object of the present invention to provide a particle processing apparatus which is enabled to rotate the disk 1 or blades 11 lightly, like a gas bearing, by making use of the compressed air indispensable.

According to a feature of the present invention, there is provided a particle processing apparatus, comprising: a barrel for accommodating particles to be processed; a disk-shaped rotating member having an outer circumference of V-shaped section and including processing device for a processing the particles in the barrel when the rotating member is rotated; a rotating device for rotating the rotating member; and an annular bearing member having an inner circumference of V-shaped section for bearing the rotating member in a rotatable manner with a small gap between its inner circumference and the outer circumference of the rotating member, the inner circumference of the bearing member being formed with a multiplicity of air injection ports for injecting therethrough compressed air supplied from the outside into the small gap.

The gas bearing rotates a shaft of rotation lightly by injecting the compressed air from a number of air injection ports formed in the inner circumference of the bearing into the small gap, which is defined between the inner circumference of the bearing and the outer circumference of the shaft, to form a compressed air layer so that the shaft may be floated to avoid direct contact with the bearing thereby drop the coefficient of friction.

According to the present invention, like the above-specified gas bearing, the bearing member for the rotating member for otating the disk 1 or the blades 11 is formed in its inner circumference with the numerous air injection ports, from which the compressed air is injected into the small gap between the rotating member and the bearing member so that the rotating member may float to rotate lightly. At the same time, the fitting portions of the rotating member and the bearing member are formed into shapes of letter "V" to bear the radial and thrust loads of the rotating member.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENTS

Figure 1A:
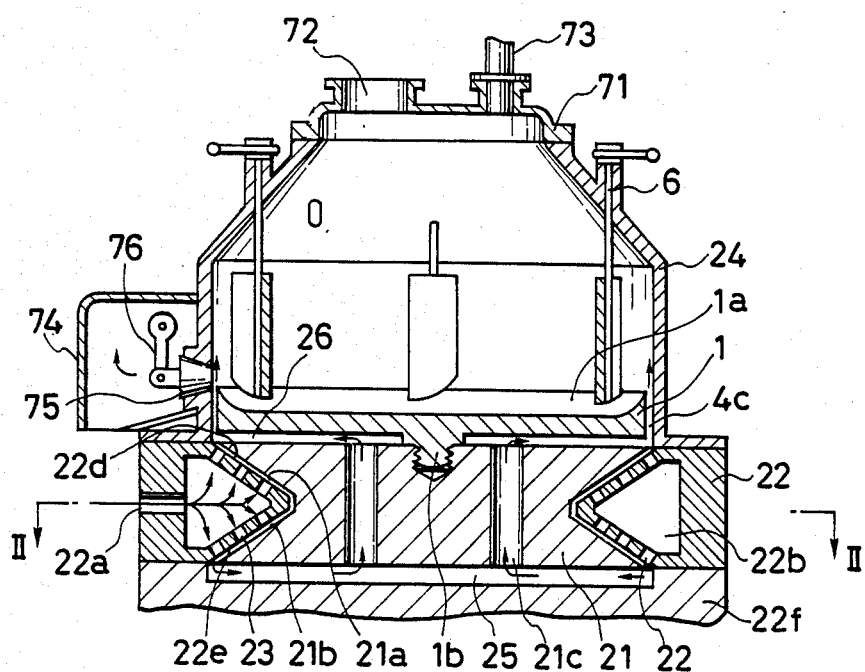
FIGS. 1 and 2 show particle processing apparatus according to embodiments of the present invention for granulating or coating operations.
Figure 1B:
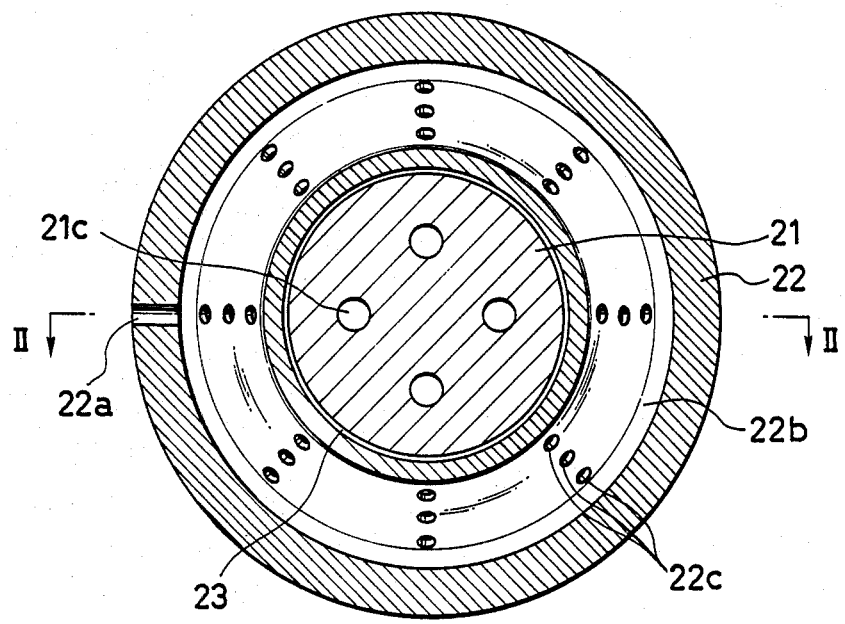
Figure 2:
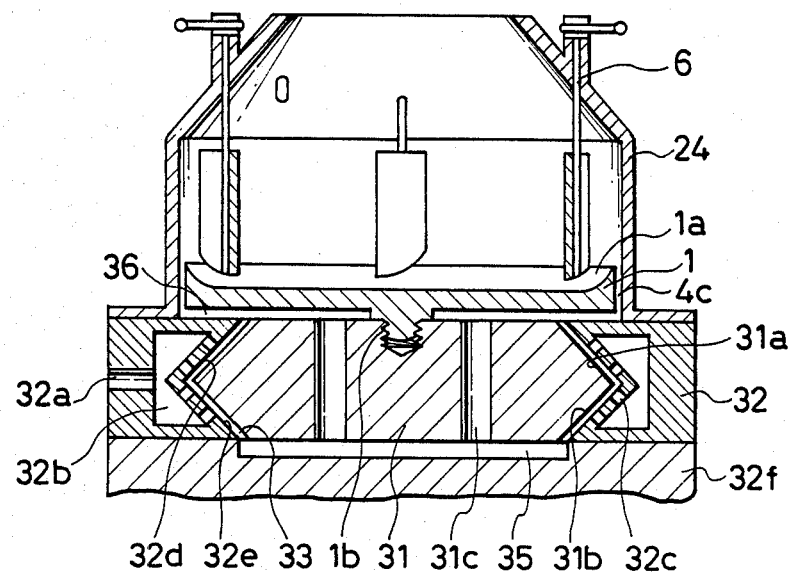
Figure 3:
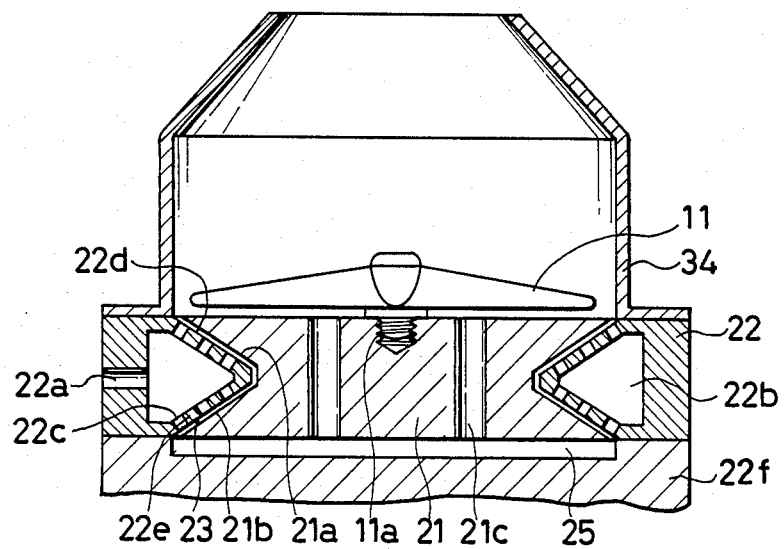
FIG. 3 shows a particle processing apparatus according to another embodiment of the present invention for blending operations.

Of FIGS. 1 to 3 showing embodiments of the present invention, FIGS. 1 and 2 show the embodiments in which the disk 1 is rotated in a processing barrel 24 equipped with the scrapers 6 so as to granulate or coat the particles on the disk 1, and FIG. 3 shows the embodiment in which the blades 11 are rotated in a processing barrel 34 so as to blend the particles in the barrel 34. FIG. 1(b) is a section I—I taken from FIG. 1(a).

Figure 4:
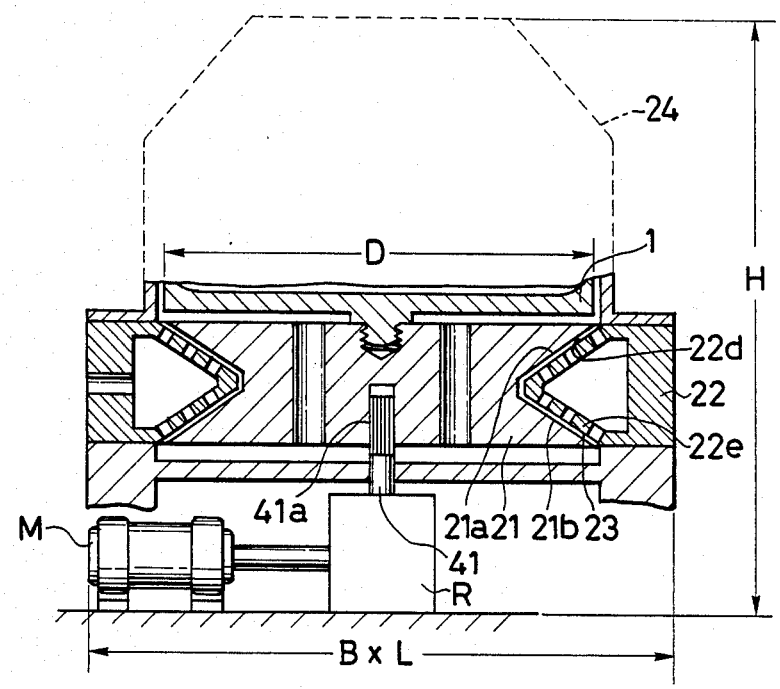
FIGS. 4 to 6 show examples of the rotating mechanism to be used in the particle processing apparatus of the present invention.
Figure 5:
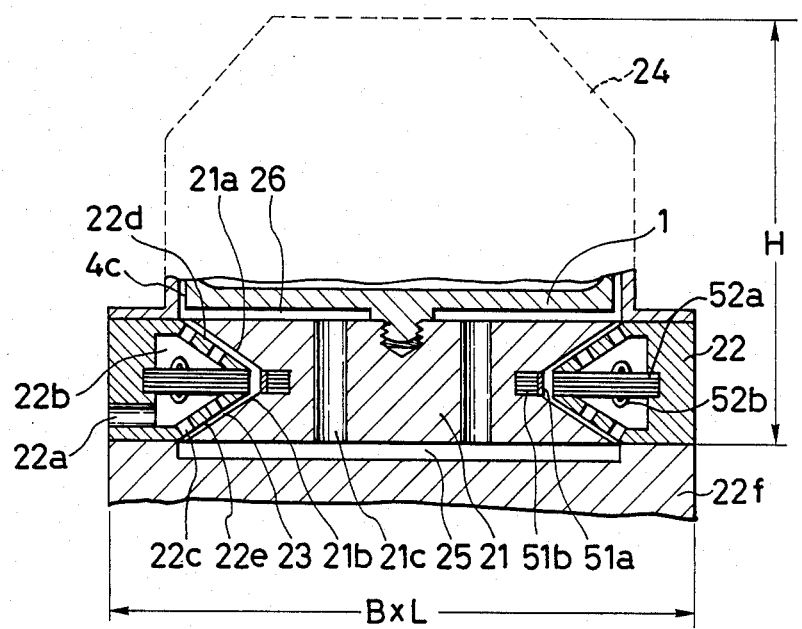

In FIG. 1(a), a rotating member 21 is so disk-shaped that the disk 1 is fixed by means of a screw 1b, and is rotated by a rotating mechanism shown in FIG. 4, 5 or 6. The rotating member 21 has its outer circumference formed into a concave V-shaped section having two slopes 21a and 21b. A bearing member 22 has an inner circumference also formed with two slopes 22d and 22e which face the two slopes 21a and 21b of the rotating member 21, respectively, to leave a small gap 23 in between. Thus, the bearing member 22 is made annular to have its outer circumference formed into a convex V-shaped section with the two slopes 22d and 22e. As a result, the rotating member 21 is rotatably fitted in the bearing member 22 through the small gap 23 such that its two slopes 21a and 21b face the two slopes 22d and 22e of the latter, respectively. On the other hand, the bearing member 22 is fixed on a bearing support 22f and supports thereon the processing barrel 24, which has a shape similar to the processing barrel 3 of FIG. 7 and is equipped with the scrapers 6. In order to inject the compressed air from the outside into the small gap 23 between the rotating member 21 and the bearing member 22, the bearing member 22 is formed in its outer circumference with an air injection port 22a which leads into an internal, annular cavity 22b and in its two slopes 22d and 22e formed with a number of injection ports 22c, which provide communication from the cavity 22b to the small gap 23, as shown in FIG. 1(b), and are opened into the two slopes 22d and 22d. The small gap 23 has its lower and upper portions communicating with each other by way of: a communication passage 25 defined by the lower face of the rotating member 21 and the bearing support 22f; a plurality of communication ports 21c providing communication between the lower and upper faces of the rotating member 21; and a communication passage 26 defined by the lower face of the disk 1 and the upper face of the rotating member 21. The upper and lower portions of the small gap 23 also have communication with the small gap 4c between the outer circumference of the disk 1 and the inner circumference of the processing barrel 24. Moreover, the pressure of the compressed air injected from the injection ports 22c into the small gap 23 is so preset as to form a layer of compressed air between the two slopes 21a and 21b of the rotating member 21 and the two slopes 22d and 22e of the bearing member 22 against the thrust of the rotating member 21 resulting from the weighs of the disk 1 and the particles poured onto the upper face 1a of the disk 1. Reference numeral 71 denotes a lid; numeral 72 a pouring port 72; and numeral 73 an air vent.

Now, if the compressed air is supplied from the outside into the air injection port 22a, it first fills up the annular cavity 22b and spurts from the injection ports 22c into the small gap 23. After having filled up this small gap 23, the compressed air partly flows directly into the small gap 4c and partly merges into the upper air flow into the small gap 4c via the communication passage 25, the communication holes 21c and the communication passage 26 so that the pressure of the compressed air layer in the small gap 23 becomes even. By this set pressure, the compressed air layer is formed between the outer circumference of the rotating member 21 and the inner circumference of the bearing member 22 to float the former member 21 in the latter member 22.

As a result, the rotating member 21 can be lightly rotated if it is rotated by means of one of the rotating mechanisms shown in FIGS. 4 to 6.

The rotating force required of these rotating mechanisms can be considerably reduced so that the cost for the driving power can be accordingly reduced to drastically drop the size of and the cost for the facilities of the apparatus of this embodiment. Here, the compressed air injected from the injection ports 22c into the small gap 23 is wholly supplied to the small gap 4c to prevent the same gap 4c from getting clogged with the particles. Reference numeral 74 denotes a discharge chute, and numeral 75 denotes a discharge damper which is opened or closed by a damper arm 76.

FIG. 2 shows another embodiment in which the relations of the shapes of the fitting portions of the outer circumference of the rotating member 21 and the inner circumference of the bearing member 22 of FIG. 1 are reversed. Specifically, the rotating member 31 prepared by fixing the disk 1 by the screw 1b has its outer circumference formed into a convex, V-shaped section by two two slopes 31a and 31b. On the other hand, a bearing member to be fitted on the rotating member 31 is formed by into such a convex, V-shaped section by two slopes 32d and 32e which face the two slopes 31a and 31b, respectively, to leave a small gap 33. The compressed air is injected from an air injection port 32a of the bearing member 32 to spurt from a number of injection ports 32c, which are opened from an annular cavity 32b in the bearing member 32 into the two slopes 32d and 32e of the bearing member 32, into the small gap 33 thereby to float the rotating member 31 in the bearing member 32. The compressed air is then fed partly from above the small gap 33 into the small gap 4c between the outer circumference of the disk 1 and the inner circumference of the processing barrel 24 and partly from below the small gap 33 into the small gap 4c by way of a communication passage 35, which is defined between the lower face of the rotating member 31 and a bearing support 32f, communication holes 31c providing communication between the lower and upper faces of the rotating member 31, and a communication passage 36 defined between the upper face of the rotating member 31 and the lower face of the disk 1. As a result, the compressed air thus fed prevents the small gap 4c from getting clogged with the particles.

Therefore, the embodiment described above have substantially the same operations and effects as those of the foregoing embodiment of FIG. 1. Incidentally, the reference numerals left undescribed with reference to FIG. 2 denote the same parts or components as those of FIG. 1.

FIG. 3 shows another embodiment in which the blades 11 in place of the disk 1 of the embodiment of FIG. 1 are fixed on the rotating member 21 by means of the screw 11a. Since the compressed air coming from the outside is injected from the injection ports 22c into the small gap 23 via the air injection port 22a, as in the embodiment of FIG. 1, the rotating member 21 and accordingly the blades 11 can be lightly rotated. Then, the compressed air is partly injected directly from above the small gap 23 and partly injected therebelow from the communication holes 21c via the communication passage 25 so that the small gap 23 can be prevented from getting clogged with the particles. Thus the embodiment of FIG. 3 also have substantially the same operations and effects as those of the embodiment of FIG. 1. According to this embodiment, however, a higher force than that for rotating the disk 1 of FIG. 1 is required for rotating the blades 11. Incidentally, the reference numerals left undescribed with reference to FIG. 3 denote the same parts or components as those of FIG. 1.

Even if, moreover, the embodiment of FIG. 2 is modified (although not shown) to use the processing barrel having no scraper for the blending operations and to fix the blades 11 in place of the disk 1 to the rotating member 31, this modification also has substantially the same operations and effects as those of the embodiment of FIG. 3.

Figure 6A:
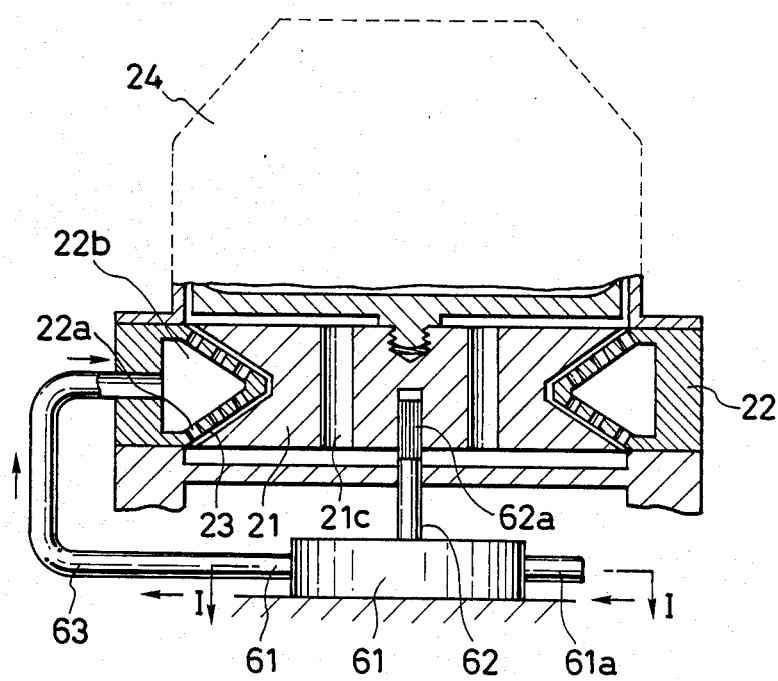
Figure 6B:
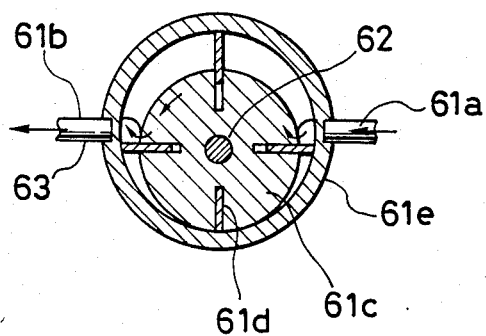

FIGS. 4 to 6 shows embodiments of rotating mechanisms for rotating the rotating member 21 of the embodiment of FIG. 1. FIG. 6(b) is a section I—I taken from FIG. 6(a). Incidentally, the reference numerals of FIGS. 4 to 6 denote the same parts or components as those of FIG. 1.

The rotating mechanism shown in FIG. 4 uses the electric motor M and the reduction gear mechanism R like the prior art, and the reduction gear mechanism R has its follower side shaft 41 fitted coaxially in the rotating member 21.

While no compressed air is being supplied, the rotating member 21 has its upper slope 21a caused to contact with the upper slope 22d of the bearing member 22 by the thrust thereof due to its own weight. If supplied with the compressed air, on the contrary, the rotating member 21 is floated to separate those two slopes 21a and 22d. As a result, the fitting relations between the shaft 41 and the rotating member 21 have to be able to transmit the rotations and allow the rotating member 21 to move in the axial direction. For these necessities, the leading end 41a of the shaft 41 is splined and fitted in the rotating member 21. This spline fitting may be replaced for the identical effects by a flexible joint such as a rubber or diaphragm joint.

The rotations of the motor M are transmitted through the reduction gear mechanism R and the fitted portion 41a of the shaft 41 to the rotating member 21. Since this rotating member 21 can be lightly rotated, as has been described with reference to FIG. 1, the drive power of the motor M of this rotating mechanism can be dropped. Since, moreover, the motor M and the reduction gear mechanism R can be small-sized, the apparatus according to this embodiment of the present invention can reduce the cost for the power and facilities and the size drastically.

FIG. 5 shows another embodiment in which an electromagnetic induction motor is used as the rotating mechanism with a view to making the size smaller than that of FIG. 4. In this electromagnetic induction motor, a rotor copper ring 51a is fixed in the vicinity of the valley defined in the outer circumference by the two slopes 21a and 21b of the rotating member 21. On the inner circumference of this rotor copper ring 51a, there is fitted a rotor iron core 51b which is prepared by stacking a number of iron plates in the axial direction of the rotor 21. In the vicinity of the crest of the inner circumference defined by the two slopes of the bearing member 22, there is fixed a stator iron core 52a which is arranged to face the rotor copper ring 51a through a small gap and which is prepared by stacking a number of iron plates in the axial direction of the rotating member 21. The iron core 52a thus constructed is wound with turns of wire 52b like the induction motor. Thus, the copper ring 51a and the iron core 51b make up the rotor, whereas the iron core 52a and the winding 52b make up the stator.

Now, if the compressed air is injected from the outside via the injection port 22a and the cavity 22b and further from the injection ports 22c into the small gap 23, the rotating member 21 is floated. If the current of an AC power source is fed to the stator winding 52b, on the other hand, a rotating magnetic field is established between the stator iron core 52a and the stator winding 52b. The rotor copper ring 51a and the rotor iron core 51b are attracted and rotated lightly by the rotating magnetic field and by the current of the copper ring 51a which is generated when the magnetic flux of the rotating magnetic field reaches the iron core 51b through the copper ring 51a.

As a result, the apparatus according to this embodiment of the present invention can also drastically reduce the costs for the power and facilities and the size like the embodiment of FIG. 4.

A rotating mechanism shown in FIG. 6 uses a vane type pneumatic motor 61 according to one example of a pneumatic motor for establishing the rotations by an air pressure. The energy of the compressed air, which is essential to the particle processing apparatus of the present invention, is used for rotating the rotating member 21.

In the vane type pneumatic motor 61, as shown in FIG. 6(b), if the compressed air is supplied from an air injection port 61a, its pressure is applied to a plurality of vanes 61d which are radially implanted in a rotor 61c mounted on a shaft 62 disposed eccentrically in a casing 61e. As a result, the rotor 61c is rotated together with the shaft 62. Like the shaft 41 of FIG. 4, this shaft 62 has its leading end 62a splined so that it is coaxially fitted in the rotating member 21. On the other hand, the pneumatic motor 61 has its air discharge port 61b connected with the air injection port 22a of the bearing member 22 by way of a piping 63.

Now, if the compressed air is supplied from the air injection port 61a of the pneumatic motor 61, the rotor 61c is rotated together with the shaft 62. Simultaneously with this, the compressed air discharged from the air discharge port 61b of the pneumatic motor 61 is fed via the piping 63 from the air injection port 22a of the bearing member 22 to the small gap 23 to float the rotating member 21 so that this rotating member 21 can be lightly rotated.

Incidentally, if the discharge pressure of the compressed air discharged from the air discharge port 61b of the pneumatic motor 61 is lower than the set pressure of the compressed air layer in the small gap 23, the air injection port 22a is supplied with the compressed air by way of another piping.

Thus, the particle processing apparatus according to this embodiment of the present invention rotates the rotating member 21 lightly by using the compressed air as the power source so that it can drop the costs for the power and facilities and the size drastically.

As has been described hereinbefore, according to the present invention, the force required for rotating the disk or the blades can be at a low level, the costs for the power and facilities and the size of the particle processing apparatus according to the present invention can be drastically reduced.

Here, in order to explain the effects of the present invention, the particle processing apparatus according to the present invention and the prior art will be compared in connection with the power required and the volume occupied.

Figure 7A:
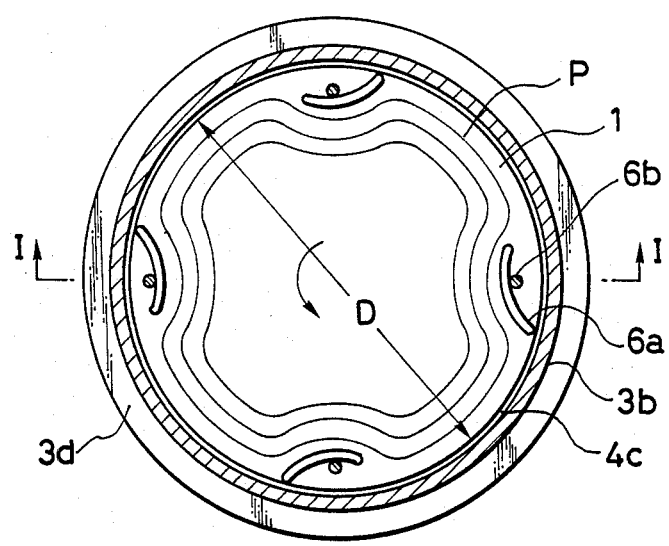
FIGS. 7 and 8 show the particle processing apparatus for the granulating or coating operations and the blending operations, respectively.
Figure 7B:
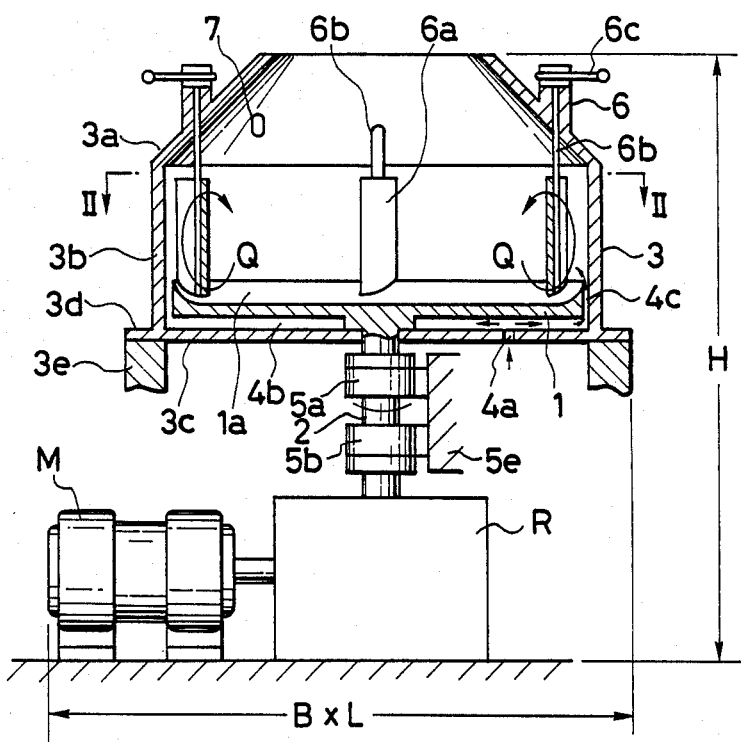
Figure 8A:
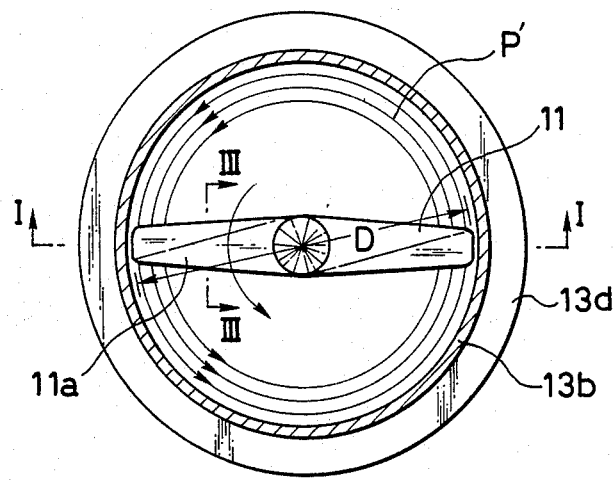
Figure 8C:
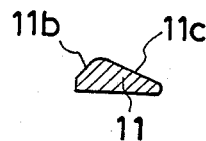
Figure 8B:
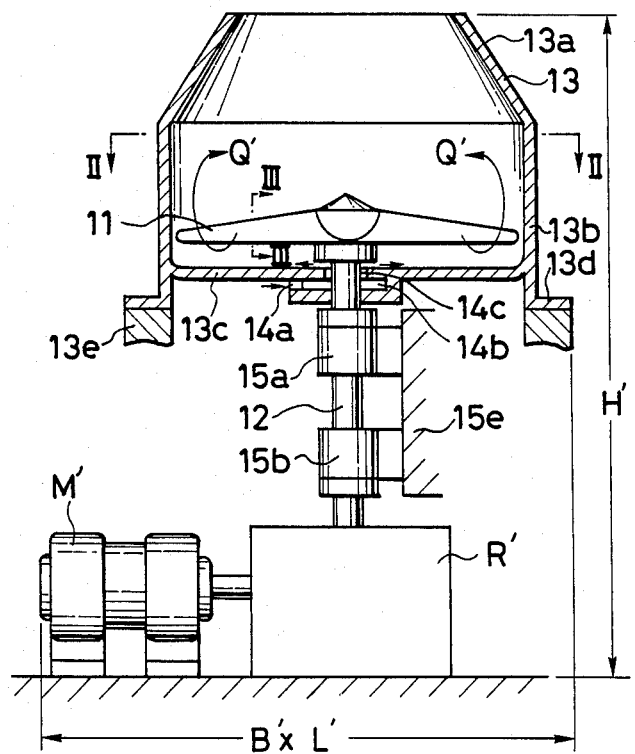

First of all, it is assumed that the disk 1 of FIG. 7 and the blades 11 of FIG. 8 have an external diameter D of 1,000 mm. Then, the power required of the motor M of FIG. 7 is 10 KW. The volume occupied by the apparatus of FIG. 7 can be calculated by the following equation if reference letters B, L and H appearing in FIG. 7 designate the width, depth and height of the floor area, respectively:

$$B \times L \times H = 1,900 \text{ mm} \times 1,000 \text{ mm} \times 1,300 \text{ mm}.$$

On the other hand, the power required of the motor of FIG. 8 is 15 KW, and the volume occupied by the apparatus of FIG. 8 can also be calculated by the following equation if reference letters B', L' and H' appearing in FIG. 8 have similar designations:

$$B' \times L' \times H' = 2,900 \text{ mm} \times 1,200 \text{ mm} \times 1,900 \text{ mm}.$$

In the particle processing apparatus for the granulating or coating operations according to the present invention, on the contrary, the power required and the volume occupied can be remarkably reduced, as listed in the following Table 1, if the external diameter of the disk 1 and the blades 11 is 1,000 mm and if the rotating member for the disk 1 and the bearing member adopted are those of the embodiment of FIG. 1:

TABLE 1

| Comparisons of Power and Volume | | | | |
|---|---|---|---|---|
| Apparatus | Rotator | Power (KW) | B × L × H (mm) | FIG. |
| Prior Art | Motor | 10 | 1,900 1,000 1,300 | 7 |
| Invention | Motor | 2.2 | 1,000 1,000 1,000 | 4 |
|  | Induction | 2.2 | 1,000 1,000 600 | 5 |
|  | Pneumatic | — | 1,000 1,000 800 | 6 |

Similar results are also obtained in the particle processing apparatus for the blending operations.

What is claimed is:

1. A particle processing apparatus comprising: a barrel for accommodating particles to be processed; a disk-shaped rotating member having an outer circumference of V-shaped section and including processing means for processing the particles in said barrel when said rotating member is rotated; rotating means for rotating said rotating member; and an annular bearing member having an inner circumference of V-shaped section for bearing said rotating member in a rotatable manner with a first small gap formed between the inner circumference of said annular bearing member and an outer circumference of said rotating member, the inner circumference of said annular bearing member being formed with a multiplicity of air injection ports for injecting therethrough compressed air supplied from outside into said first small gap, an upper part of said first small gap opening into a second small gap formed between said processing means and said rotating member along a bottom of said processing means, and a lower part of said first small gap communicating with said second small gap through a communication passage, formed below said rotating member, and a plurality of communication ports, which pass through said rotating member and pen into said second small gap.

2. A particle processing apparatus according to claim 1, wherein said barrel includes a scraper arranged therein, and wherein said processing means is a disk carried in said barrel by said rotating member and associated with said scraper for granulating or coating the particles on said disk.

3. A particle processing apparatus according to claim 1, wherein said processing means is a blade carried on said rotating member for blending the particles in said barrel.

4. A particle processing apparatus according to claim 1, wherein said rotating means includes an electric motor having its shaft connected to said rotating member.

5. A particle processing apparatus according to claim 1, wherein said rotating means includes an electromagnetic induction motor having: a rotor fitted in said rotating member and composed of a copper ring and an iron core; and a stator fitted in said bearing member and composed of an iron core and a winding.

6. A particle processing apparatus according to claim 1, wherein said rotating means includes a pneumatic motor having its shaft connected to said rotating member.

7. A particle processing apparatus according to claim 1, wherein said rotating means comprises an electromagnetic induction device having a rotor mounted in said annular bearing member and a stator, said rotor having a copper ring exposed on its outer circumference and an iron core formed by stacking a number of iron plates in the axial direction of said rotor and fixed to the inner circumference of said copper ring and said stator having an iron core arranged to face said rotor copper ring with its end face held exposed and formed by stacking a number of iron plates inwardly of its inner surface in the axial direction of said rotor, with said stator being wound with an electrical wire connected to an AC power source.

* * * * *